United States Patent
Damidaux et al.

(10) Patent No.: US 7,489,272 B2
(45) Date of Patent: Feb. 10, 2009

(54) DEVICE FOR GENERATION OF FORMAT DESCRIPTION MESSAGES OF FUTURE MESSAGES RELATING TO A SATELLITE NAVIGATION SYSTEM

(75) Inventors: Jean-Louis Damidaux, Auzielle (FR); Charles Fernet, Toulouse (FR)

(73) Assignee: Alcatel Lucent, Paris (FR)

(*) Notice: Subject to any disclaimer, the term of this patent is extended or adjusted under 35 U.S.C. 154(b) by 0 days.

(21) Appl. No.: 11/775,675

(22) Filed: Jul. 10, 2007

(65) Prior Publication Data

US 2008/0136706 A1   Jun. 12, 2008

(30) Foreign Application Priority Data

Jul. 11, 2006   (FR) ................... 06 52901

(51) Int. Cl.
*G01S 1/00* (2006.01)
*H04B 7/185* (2006.01)

(52) U.S. Cl. ............................. 342/357.06
(58) Field of Classification Search ........... 342/357.06, 342/357.12, 357.13, 352
See application file for complete search history.

(56) References Cited

U.S. PATENT DOCUMENTS

| 5,153,598 | A | 10/1992 | Alves, Jr. |
| 2002/0152467 | A1 | 10/2002 | Fialles |
| 2004/0073365 | A1 | 4/2004 | Alanen et al. |

FOREIGN PATENT DOCUMENTS

| EP | 1063597 A2 | 12/2000 |
| WO | WO 96/28901 A1 | 9/1996 |
| WO | WO 03/040749 A1 | 5/2003 |

*Primary Examiner*—Thomas H Tarcza
*Assistant Examiner*—Fred H Mull
(74) *Attorney, Agent, or Firm*—Sughrue Mion, PLLC

(57) ABSTRACT

A device is dedicated to generating messages relating to at least one satellite navigation system and to be sent to navigation receivers. This device comprises processor means responsible for generating "description" messages to be broadcast to the navigation receivers from a chosen date and comprising a description of a format of future messages to be broadcast to the navigation receivers from a date after the chosen date.

10 Claims, 1 Drawing Sheet

DEVICE FOR GENERATION OF FORMAT DESCRIPTION MESSAGES OF FUTURE MESSAGES RELATING TO A SATELLITE NAVIGATION SYSTEM

CROSS-REFERENCE TO RELATED APPLICATIONS

This application is based on French Patent Application No. FR 0652901 filed Jul. 11, 2007, the disclosure of which is hereby incorporated by reference thereto in its entirety, and the priority of which is hereby claimed under 35 U.S.C. §119.

BACKGROUND OF THE INVENTION

1. Field of the Invention

The invention concerns satellite navigation systems (of RNSS (Radio Navigation Satellite System) or GNSS (Global Navigation Satellite System) type), and more precisely the generation of messages that relate to such systems and are to be sent to navigation receivers.

Here "satellite navigation system" means any system dedicated to navigation and including a constellation of satellites placed in orbit around a heavenly body (for example the Earth), a set of (terrestrial or spatial) satellite surveillance stations, and a computer center. It could be one of the existing systems (GPS, GLONASS), for example, or one of the planned systems (GALILEO, COMPASS), or one of their equivalents or derivatives.

2. Description of the Prior Art

As the person skilled in the art knows, satellite navigation systems periodically broadcast (navigation and integrity) messages including navigation information relating to the orbital positions and/or synchronizations (internal clock offset relative to the reference clock of the system) of their satellites to navigation receivers of users by means of their satellites (and/or associated equipments, for example pseudolites (such as transmitters on the ground or onboard high-altitude aircraft)).

Such messages generally consist of parameters having their own type and representation (integer, floating point, number of bits and the like) that are predefined and contained in successive data fields associated with each other in a predefined way.

The navigation receivers therefore have available an interface knowing the parameter types and representations that are contained in the broadcast messages and how the fields containing these parameters are associated with each other in broadcast messages. In other words, the interface of each navigation receiver is specifically configured as a function of the format of the messages received in order to be able to understand their contents.

Navigation systems are subject to increasingly frequent changes to implement new services and/or to correct problems. Some of these changes may necessitate modification of the format of the messages. For example, a change may add one or more parameters or modify the type and/or the representation of one or more parameters.

Such format modifications are often incompatible with existing navigation receivers and so certain changes to the navigation systems cannot be put into effect.

For the GPS, it has been proposed to add a new dedicated signal "L1C" to the signal "L1 C/A". The messages of the new signal L1C are understandable to new generations of navigation receiver and are much more effective than those of the signal L1 C/A. This new signal L1C is transmitted on the same frequency as the signal L1 C/A. The drawback of this solution lies in the fact that it imposes the broadcasting of both signals L1 C/A and L1C, which is costly and consumes too much of the limited resources.

Another solution has been proposed for "augmented" navigation systems or SBAS (Satellite Based Augmentation Systems) that currently have limited capacities that in particular prevent surveillance of more than 51 satellites. It has therefore been proposed to add to the signal "L1" dedicated to messages understandable by older generation navigation receivers a new signal "L5 I" dedicated to messages understandable by new generations of navigation receiver. This new signal L5 I is transmitted on a frequency different from that used for the signal L1. The drawback of this solution lies in the fact that the service offered by the signal L1 is significantly inferior to that offered by the new signal L5 I, which is detrimental to older generation receivers adapted only to the signal L1.

Thus an object of the invention is to remove some or all of the drawbacks referred to above.

SUMMARY OF THE INVENTION

To this end the invention proposes a device dedicated to generating messages relating to at least one satellite navigation system and to be sent to navigation receivers, comprising processor means adapted to generate "description" messages to be broadcast to the navigation receivers from a chosen date and comprising a description of the format of future messages to be broadcast to the receivers from a date after the chosen date.

Thus the navigation receivers can store the description of a new message format before the latter is modified, so that as soon as the satellite navigation system begins to broadcast messages with the new format they can be reconfigured to be able to understand (and thus use) their content immediately.

The device according to the invention may have other features and in particular, separately or in combination:

its processor means can be responsible for defining format descriptions comprising at least descriptions of successive data fields associated with respective parameters (each described by at least one type and one representation, for example) and how these data fields will be associated with each other to constitute the future messages;

its processor means can be responsible for adding to the format description definitions data representative of the frequency of repetition of the future messages;

its processor means can be responsible for generating said description messages periodically, in which case the period is made long compared to the period for transmission of the messages;

its processor means can be responsible for generating the description messages over a long period starting from the chosen date.

The invention also proposes equipment for transmitting messages relating to a satellite navigation system, comprising a message generation device of the type described above and transmission means responsible for transmitting messages and description messages generated by the device to the satellites of the satellite navigation system and/or broadcasting equipment(s) associated with said satellite navigation system.

The invention further proposes equipment for a satellite navigation system, comprising a message generation device of the type described above.

The invention further proposes a navigation receiver comprising i) receiver means (adapted to receive messages relating to a satellite navigation system), ii) interface means (configured to use the messages received by the receiver means), iii) storage means and iv) processor means responsible, in case of reception of a description message generated by a message generation device of the type described above, for storing the new format description that it contains in the storage means and, in the case of reception of an instruction to change configuration, for reconfiguring the interface means as a function of the stored new format description, so that the interface means can use messages having the new format.

The invention is particularly well adapted, although not exclusively so, to satellite navigation systems such as GALILEO, GPS, GLONASS and COMPASS, for example, and variants and equivalents thereof, including those operating in "assisted" mode.

Other features and advantages of the invention will become apparent on reading the following detailed description and examining the appended drawing.

The appended drawings constitute part of the description of the invention as well as contributing to the definition of the invention, if necessary.

DETAILED DESCRIPTION OF THE PREFERRED EMBODIMENT

An object of the invention is to enable reconfiguration of navigation receivers so that they can use messages relating to at least one satellite navigation system broadcast with a new format by satellites of said satellite navigation system and/or by equipments associated therewith, for example pseudolites (such as transmitters on the ground or onboard high-altitude aircraft).

It is considered hereinafter by way of nonlimiting example that the satellite navigation system is the planned GALILEO system. The invention is not limited to that system, however. In fact it concerns all satellite navigation systems broadcasting (or for which are broadcast) messages (navigation and where applicable integrity messages) having a predefined format to navigation receivers of users, and in particular existing systems of GPS or GLONASS type, and the planned COMPASS system, as well as all equivalents and derivatives thereof, including those operating in "assisted" mode.

Figure 1:
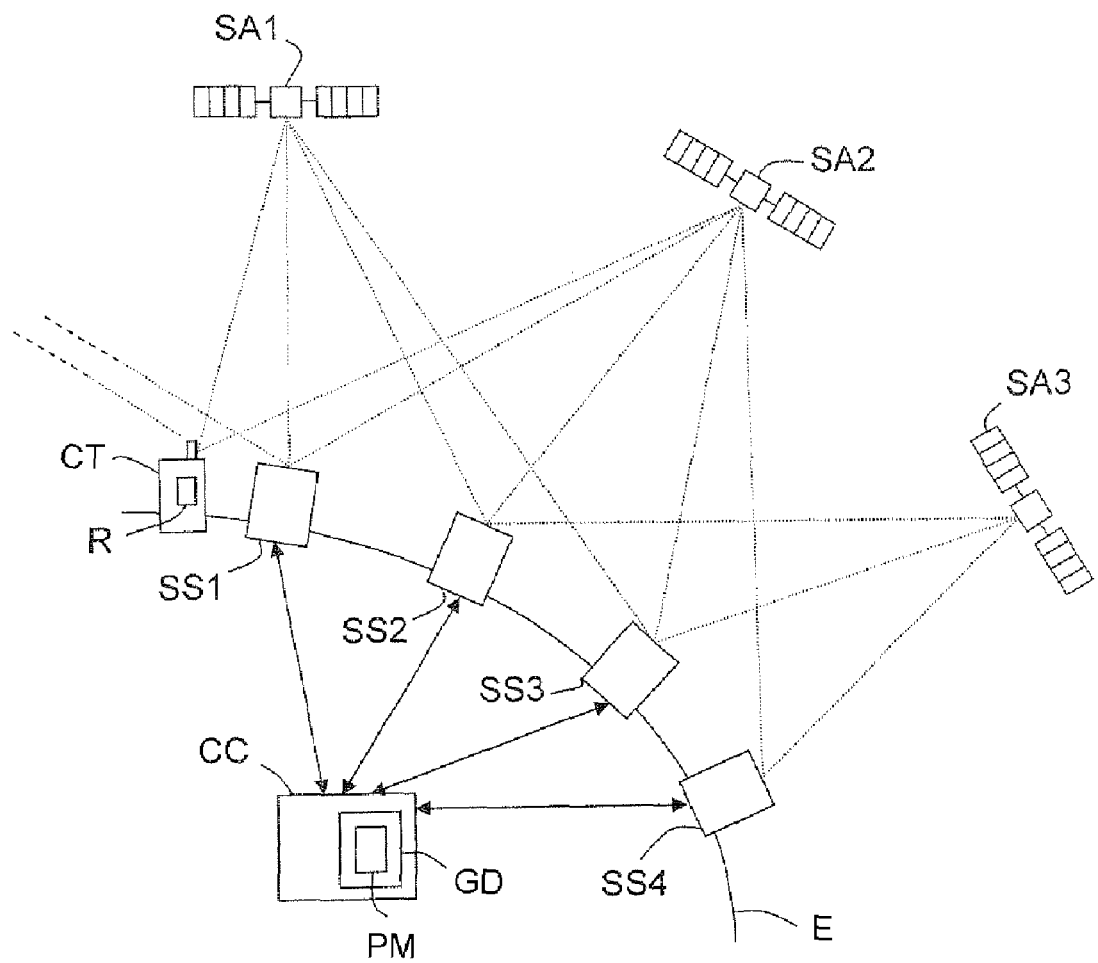
FIG. 1 shows highly schematically and functionally a portion of a satellite navigation system comprising a computer center equipped with one embodiment of a message generation device of the invention.

As shown diagrammatically and partially in FIG. 1, a satellite navigation system comprises at least one constellation of satellites SAi (here i=1 to 3, but in reality its maximum value is much greater, typically 36 in the case of the GALILEO system), a set of (terrestrial or spatial) surveillance stations SSj (here j=1 to 4, but in reality its maximum value is much greater, typically from 40 to 100 in the case of the GALILEO system), and a computer center CC.

Broadly speaking, the satellites SAi are placed in orbit around the Earth E and are responsible, in particular, for sending signals for measuring pseudo-distances and generally for broadcasting in the direction of the Earth E messages (having a predefined format) transmitted by the mission ground segment. The information contained in these messages is intended to be used by navigation receivers R, which may be installed in communication terminals CT (as shown), and by the surveillance stations SSj.

It is considered hereinafter by way of nonlimiting example that the messages broadcast are navigation messages. It is further considered by way of nonlimiting example that the messages are broadcast only by the satellites SAi of the satellite navigation system. However, some or all of the messages could be broadcast by other equipments associated with the satellite navigation system, for example pseudolites (such as transmitters on the ground or on high-altitude aircraft).

It will be noted that a (navigation) receiver R can itself constitute a communication equipment. Moreover, a (navigation) receiver R can be installed in any type of communication terminal (or equipment) CT, and in particular in a mobile (or cellular) telephone, a portable or onboard computer, or a personal digital assistant (PDA).

The invention proposes to add a message generation device GD to the satellite navigation system. As shown in FIG. 1, this message generation device GD can be part of the computer center CC. This is not obligatory, however.

The message generation device GD includes a processor module PM responsible for generating messages of a new type, called description messages, to be sent to the receivers R when it is instructed to do so.

More precisely, the processor module PM is responsible for generating from a chosen date (that is imposed on it) description messages that include the description of the format of future navigation messages that will be broadcast to the receivers R, for example by the satellites SAi (although this is not obligatory), from a date after the chosen date.

The description messages are therefore intended to supply to the receivers R, which are configured, at a given time, to use navigation messages having a predefined format, the description of the impending format of future navigation messages before the current format is modified.

Figure 2:
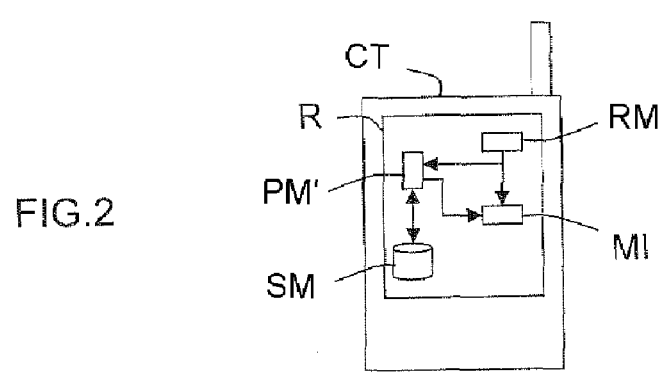
FIG. 2 shows highly schematically and functionally a communication terminal (here a mobile communication terminal) equipped with one embodiment of a navigation receiver of the invention.

As shown diagrammatically and functionally in FIG. 2, a receiver R of the invention comprises a receiver module RM, an interface MI, storage means SM and a processor module PM'.

The receiver module RM is responsible for receiving navigation and description messages that are broadcast by the satellite navigation system (and/or by any other associated equipment).

The interface MI is configured to be able to use the navigation messages that are received by the receiver module RM with the current predefined format. This interface MI is reconfigurable. To this end, it comprises an EEPROM (Electrically Erasable Programmable Read-Only Memory) type memory, for example.

This interface MI provides the transcoding table function. It is in fact responsible for converting the information contained in each navigation message in the format for which it is configured into a format that is usable by its receiver R.

The storage means SM can take any form, for example a memory.

The processor module PM' is firstly responsible, each time that the receiver module RM receives a description message, for storing in the storage means SM the description of the new format contained in the description message. To this end, it observes the messages that the receiver module RM receives in order to extract the information that is contained in the description messages (and that constitutes the description of the future new format), after which it transmits the extracted information to the storage means SM.

It is also responsible, if the receiver module RM receives from the satellite navigation system an instruction requiring the configuration of the interface MI to be changed, to access the storage means SM in order to extract the stored description of the new format. It then reconfigures the interface MI as a function of this new format description. The interface MI is then able to use navigation messages with the new format communicated to it by the receiver module RM.

The processor device PM' and the storage means SM of the navigation receiver R of the invention can be produced in the form of electronic circuits, software (or electronic data processing) modules, or a combination of circuits and software.

Each new format description defined by the processor module PM of the device GD preferably comprises at least the descriptions of successive data fields dedicated to respective different parameters and how those data fields will be associated with each other to constitute the future navigation messages.

It is important to note that a new format can differ from a current format in any way. Thus a new format can have one or more fields added to it compared to a current format, one or more fields removed from it compared to a current format, or a combination of one or more fields added to it and one or more fields removed from it compared to a current format.

Alternatively, or in addition to this, a new format can include the same number of fields as a current format, but at least one of its fields can be dedicated to a parameter whose type and/or representation is (are) not the same as that (those) of the same parameter with the current format.

Here "parameter type" means the format of said parameter, namely logic, enumeration, integer, floating point. Moreover, here "representation of a parameter" refers to the fact that the parameter is either an integer coded on 16bits or 32 bits, signed or unsigned, for example, or a floating point number coded on 32 bits or 64 bits.

Accordingly, a parameter with a new format can be defined by a larger or smaller number of bits than the same parameter with the current format.

The processor module PM of the device GD can also be responsible for adding to the format description of each description message data representing the repetition frequency of future navigation messages. This information is used to program the operating ranges of the receiver R so that it is powered up when a navigation message should reach it.

It will be noted that the receivers R must also be configured so as to be powered up for the time it takes to receive the whole of a new format description. For example, the system communicates a date of application of the future new format to the receivers R a long time in advance by means of messages, and the description messages begin to be transmitted once the date of application has been communicated. Accordingly, as soon as a receiver R is aware of the date of application, it remains powered up for the time it takes to receive the whole of the new format description, and then reverts to its normal (standard) operation until the date of application, on which it is reconfigured using the stored new format.

Moreover, the processor module PM of the device GD preferably generates its description messages periodically. The period for transmission of description messages is then preferably made longer, or even much longer, than the period for transmission of navigation messages, in order not to consume too much bandwidth. For example, if the period for transmission of navigation messages is from around 30 seconds to around 5 minutes, then the period for transmission of description messages can be from around one hour to around one day.

The period for which the satellite navigation system requires the processor module PM of the device GD to generate description messages for a new format before the latter is installed is preferably made long. For example, this period is from around six months to around two years. Accordingly, the receivers R have sufficient time to store the new format description.

The message generation device GD of the invention, and in particular its processor module PM, can be produced in the form of electronic circuits, software (or electronic data processing) modules, or a combination of circuits and software.

Although this is not the case in the example shown in FIG. 1, the message generation device GD of the invention can form part of a message transmission equipment belonging to the satellite navigation system, for example (although this is not obligatory). In this case, the equipment includes a transmission module responsible for transmitting the navigation messages and the description messages generated by the device GD to the satellites SAi (and/or to any other equipment responsible for broadcasting).

Thanks to the invention, it is therefore possible to evolve (or correct) a satellite navigation system without sacrificing compatibility with the existing installed base of navigation receivers.

The invention is not limited to the message generation device, system equipment, message transmission equipment and navigation receiver embodiments described hereinabove by way of example only, and encompasses all variants that the person skilled in the art might envisage within the scope of the following claims.

Thus an application of the invention to navigation messages has been described hereinabove. However, the invention applies to any type of message relating to a satellite navigation system, and in particular to integrity messages, whether broadcast by the satellites of said satellite navigation system and/or by equipments associated therewith, for example pseudolites (such as transmitters on the ground or onboard high-altitude aircraft).

There is claimed:

1. A device for generating messages relating to at least one satellite navigation system and to be sent to navigation receivers, comprising a processor adapted to generate "description" messages to be broadcast to said navigation receivers from a chosen date and comprising a description of a format of future messages to be broadcast to said navigation receivers from a date after said chosen date.

2. A device according to claim 1, wherein said processor is adapted to define format descriptions comprising at least descriptions of successive data fields dedicated to respective parameters and how said data fields will be associated with each other to constitute said future messages.

3. A device according to claim 2, wherein each parameter is described by at least one type and one representation.

4. A device according to claim 2, wherein said processor is adapted to add to the format description definitions data representative of a frequency of repetition of said future messages.

5. A device according to claim 1, wherein said processor is adapted to generate said description messages periodically, the period being long compared to the period for transmission of said messages.

6. A device according to claim 1, wherein said processor is adapted to generate said description messages over a long period starting from said chosen date.

7. Equipment for a satellite navigation system, comprising a message generation device as claimed in claim 1.

8. Equipment for transmitting messages relating to a satellite navigation system, comprising a message generation device as claimed in claim 1 and transmission means responsible for transmitting navigation messages and description messages generated by said device to the satellites of said satellite navigation system and/or broadcasting equipment(s) associated with said satellite navigation system.

9. A navigation receiver comprising receiver means adapted to receive messages relating to a satellite navigation system and interface means adapted to be configured to use the messages received by said receiver means, which receiver comprises storage means and a processor adapted, in case of reception of a description message generated by a message generation device as claimed in claim 1, to store the new format description that it contains in said storage means and, in the case of reception of an instruction to change configuration, to reconfigure said interface means as a function of said stored new format description, so that said interface means can use messages having said new format.

10. The device according to claim 1, wherein said at least one satellite navigation systems comprises at least one of GALILEO, GPS, GLONASS and COMPASS.

* * * * *